(12) United States Patent
De Silva

(10) Patent No.: US 7,590,487 B2
(45) Date of Patent: Sep. 15, 2009

(54) METHOD AND APPARATUS OF DISPLAYING THREE-DIMENSIONAL ARRIVAL SCREEN FOR NAVIGATION SYSTEM

(75) Inventor: Andrew De Silva, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 385 days.

(21) Appl. No.: 11/502,009

(22) Filed: Aug. 10, 2006

(65) Prior Publication Data

US 2008/0040024 A1  Feb. 14, 2008

(51) Int. Cl.
*G01C 21/30* (2006.01)
(52) U.S. Cl. .................................... 701/209; 340/995.1
(58) Field of Classification Search ................. 701/208, 701/201, 209; 340/995.1
See application file for complete search history.

(56) References Cited

U.S. PATENT DOCUMENTS

| | | | | |
|---|---|---|---|---|
| 5,884,218 A | * | 3/1999 | Nimura et al. | 701/208 |
| 6,871,143 B2 | * | 3/2005 | Fujiwara | 701/211 |
| 7,353,114 B1 | * | 4/2008 | Rohlf et al. | 702/5 |
| 7,376,510 B1 | * | 5/2008 | Green | 701/209 |
| 7,420,558 B2 | * | 9/2008 | Urano et al. | 345/427 |
| 2006/0200312 A1 | * | 9/2006 | Osaka | 701/211 |
| 2008/0195314 A1 | * | 8/2008 | Green | 701/211 |
| 2008/0238914 A1 | * | 10/2008 | Adachi et al. | 345/419 |

FOREIGN PATENT DOCUMENTS

JP      9-212086      8/1997

* cited by examiner

*Primary Examiner*—Mark Hellner
(74) *Attorney, Agent, or Firm*—Muramatsu & Associates

(57) ABSTRACT

A method and apparatus of displaying a three-dimensional arrival screen allows the user to more easily and accurately identify the actual location of the destination by displaying the three-dimensional arrival screen which shows the relationship among the location of the destination, the locations of the neighboring addresses, and the current vehicle position. The method includes the steps of receiving a street address number of a destination, retrieving data indicating a road segment which includes the specified street address number, estimating positions of the destination and neighboring addresses based on street numbers of the destination, neighboring addresses, and position data of the road segment, and displaying a three-dimensional arrival screen when the user comes within the predetermined distance range from the destination.

20 Claims, 11 Drawing Sheets

METHOD AND APPARATUS OF DISPLAYING THREE-DIMENSIONAL ARRIVAL SCREEN FOR NAVIGATION SYSTEM

FIELD OF THE INVENTION

This invention relates generally to a method and apparatus for displaying an image for a navigation system, and more particularly, to a method and apparatus for displaying a destination arrival screen of a three-dimensional image for a navigation system that allows a user to easily correlate an actual position of the destination with the addresses, structures, and other indicators on the screen in the neighborhood of the destination, thereby more accurately detecting the arrival at the destination.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium. Typically, the navigation system displays a map image on a monitor screen while superimposing thereon a mark representing the current vehicle position. At an intersection associated with the calculated route, the navigation system notifies the user which direction to turn at the intersection to reach the destination.

FIGS. 1A-1H show an example of overall procedure and screen displays involved in the operation of the navigation system. FIG. 1A shows an example of locator map screen of the navigation system when the destination is not specified. Typically, the navigation system displays a street on which the vehicle (vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The user selects a desired category of destination from the lists.

FIG. 1F shows a screen when the user has selected a "Fast Foods" category in the example of FIG. 1E. In this example, the screen includes the name of POI type "Fast Foods" at the top and a list of names of the fast food restaurants typically sorted by distance from the current position. The user selects a particular restaurant among the restaurant lists for route guidance. In FIG. 1G, the navigation system determines an appropriate route to the destination. After determining the calculated route, the navigation system starts the route guidance as shown in FIG. 1H.

Typically, the navigation system will show an arrival screen such as shown in FIGS. 2A and 2B when the vehicle approaches the destination. The current vehicle position indicator 71 and the destination icon 91 are shown on the map image. The screens shown in FIGS. 2A and 2B are similar to those displayed while the navigation system guides the user to the destination, except that the screens show the destination icon 91 that indicates the location of the destination on the map image.

FIG. 2A shows the situation where the user is close to the destination but has not yet reached the destination while FIG. 2B shows the situation where the vehicle has reached the destination. In FIG. 2B, the navigation system announces that the vehicle has arrived at the destination when the vehicle is within an arrival detection range such as 200 yards. However, since the destination icon 91 on the map image does not show the accurate location, when there are many houses or buildings within the arrival detection range, the user will encounter difficulties in locating the exact destination if it is a new place for the user. Thus, there is a need for a navigation system to allow the user to more easily and accurately identify the actual location of the destination.

SUMMARY OF THE INVENTION

It is, therefore, an object of the present invention to provide a method and apparatus of displaying a three-dimensional arrival screen for a navigation system which shows more accurate relationship among the location of the destination, the locations of the neighboring addresses, and the current vehicle position.

It is another object of the present invention to provide a method and apparatus for displaying a three-dimensional arrival screen for a navigation system which shows position marks and street address numbers of the destination and neighboring addresses.

It is a further object of the present invention to provide a method and apparatus for displaying a three-dimensional arrival screen which is able to use building footprint data in combination with road segment data and address data for accurately defining the position of the destination.

One aspect of the present invention is a method for displaying a three-dimensional arrival screen showing a positional relationship among the destination and neighboring addresses. The method includes the steps of receiving a street address number of a destination specified by a user, retrieving data indicating a road segment which includes the specified street address number thereon from a map information storage, estimating positions of the destination and neighboring addresses based on street numbers of the destination, neighboring addresses, position data of the road segment, detecting whether the user comes within a predetermined distance range from the destination, and displaying a three-dimensional arrival screen when the user comes within the predetermined distance range from the destination.

The three-dimensional arrival screen includes a position of the destination, a current position of the user, a road on which the user is moving, and street address numbers of the destination and the neighboring addresses. The three-dimensional arrival screen further includes position marks showing the positions of the destination and the neighboring addresses.

The three-dimensional arrival screen further includes an image showing a topological shape of the building derived from footprint data.

The method for displaying an arrival screen further includes the steps of checking whether any footprint data exist adjacent to the road segment which includes the specified street address of the destination, and estimating positions of the destination and neighboring addresses by incorporating position information included in the footprint data. The footprint data of a building includes the position information which is expressed by latitude and longitude data indicating a shape, size and location of the building, or other means.

The process of estimating the positions of the destination and neighboring addresses includes a process of interpolating between two street address numbers on the road segment when absolute positions of the two street address numbers are known. When footprint data is available, the process of estimating the positions by incorporating the position information included in the footprint data includes a process of interpolating between a street address number on the road segment and a selected point on the road segment corresponding to the latitude and longitude data of the building.

On the three-dimensional arrival screen, the position marks and street address numbers are provided on one side of the road on which the user is moving where the destination is located on the one side. Alternatively, the position marks and street address numbers are provided on both sides of the road on which the user is moving without regard to which side of the road the destination is located.

Another aspect of the present invention is an apparatus for displaying a three-dimensional arrival screen for a navigation system for implementing the various steps of the method noted above. The navigation system is designed to determine accurate locations corresponding to street address numbers and displays more accurate relationship among the location of the destination, the locations of the neighboring addresses, and the current vehicle position on the three-dimensional arrival screen.

According to the present invention, the navigation system allows the user to more easily and accurately identify the actual location of the destination by displaying the three-dimensional arrival screen which shows the relationship among the location of the destination, the locations of the neighboring addresses, and the current vehicle position. Since the three-dimensional arrival screen shows position marks and street address numbers of the destination and neighboring addresses, the user is able to accurately specify the destination by comparing the image on the three-dimensional screen with the outside view.

BRIEF DESCRIPTION OF THE DRAWINGS

FIG. 2A shows the situation where the vehicle is close to the destination and FIG. 2B shows the situation where the vehicle has reached the destination.

FIGS. 3A and 3B show a relationship between two-dimensional and three-dimensional map images that can be switched with one another, FIG. 3C shows the situation where the vehicle is close to the destination, and FIG. 3D shows the situation where the vehicle has arrived at the destination.

FIG. 7A is an arrival screen showing neighboring address locations on both sides of the road, and FIG. 7B is an arrival screen showing crossroads of the neighboring address locations.

DETAILED DESCRIPTION OF THE PREFERRED EMBODIMENT

The present invention will be described in detail with reference to the accompanying drawings. In the present invention, the method and apparatus for a navigation system displays a destination arrival image which is an intuitive three-dimensional view of a destination including street address numbers in the neighborhood of the destination. When the vehicle approaches within a predetermined distance from the destination, the navigation system displays the three-dimensional arrival screen which includes a mark of the destination and its street address number as well as neighboring street address numbers and position marks such that the user can readily correlate the present location and the locations on the arrival screen.

Although the description is made for the case that the three-dimensional arrival screen of the present invention is implemented to a vehicle, it should be noted that the present invention can be implemented to other devices or transportation machine. For instance, the present invention may be implemented to a hand-held device having a navigation function such as a PDA (personal digital assistant), a cellular phone, or a laptop computer.

Figure 1A:
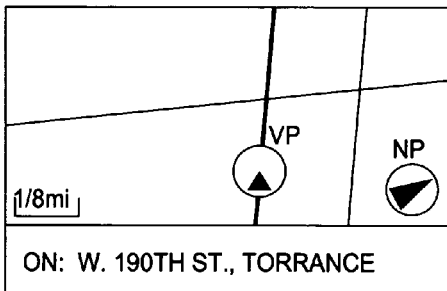
FIGS. 1A-1H are schematic diagrams showing an example of operational process and screen displays involved in the navigation system for selecting a destination.
Figure 1B:
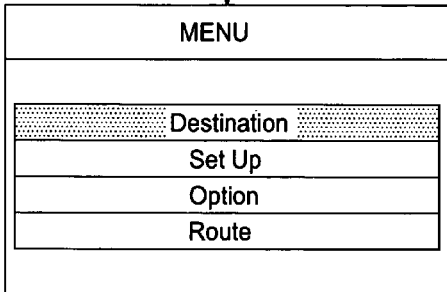
Figure 1C:
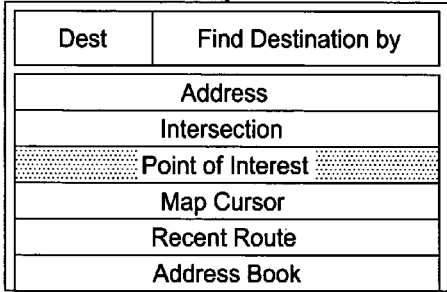
Figure 1D:
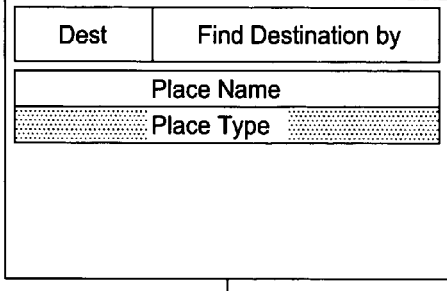
Figure 1E:
Figure 1F:
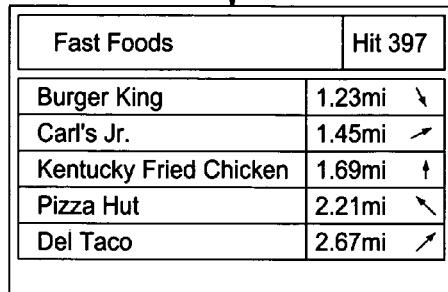
Figure 1G:
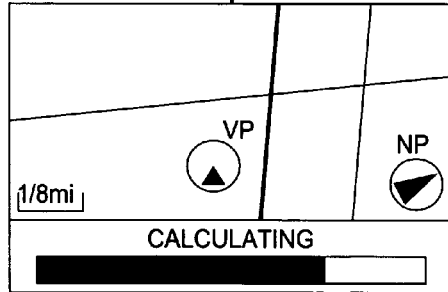
Figure 1H:
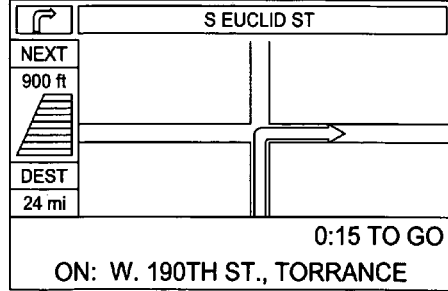
Figure 2A:
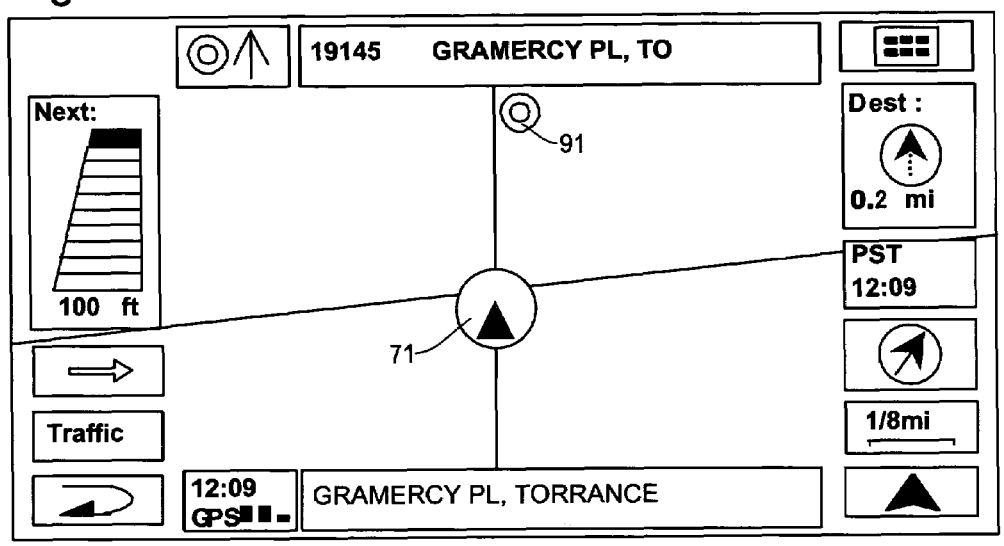
FIGS. 2A and 2B are schematic diagrams showing examples of screen display of a conventional navigation system, where
Figure 2B:
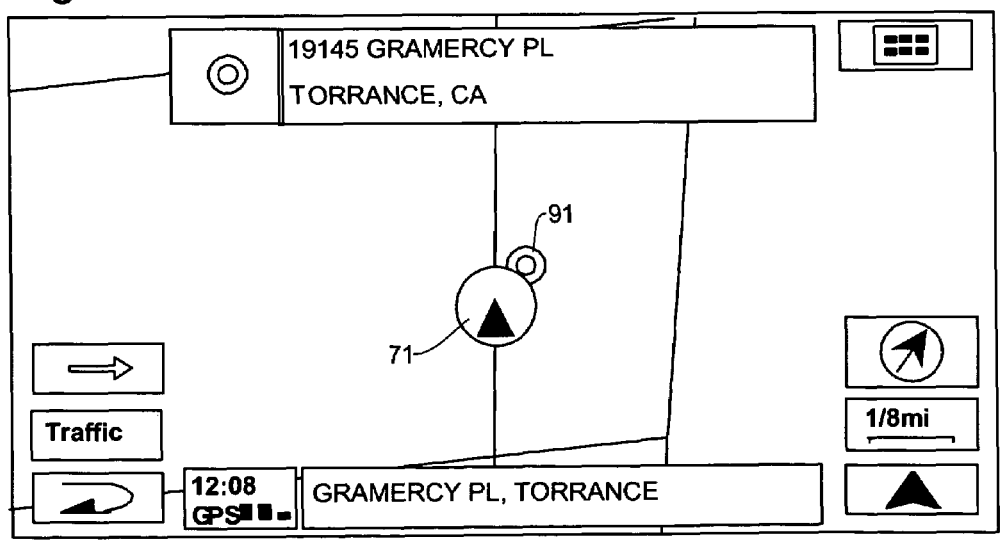
Figure 3A:
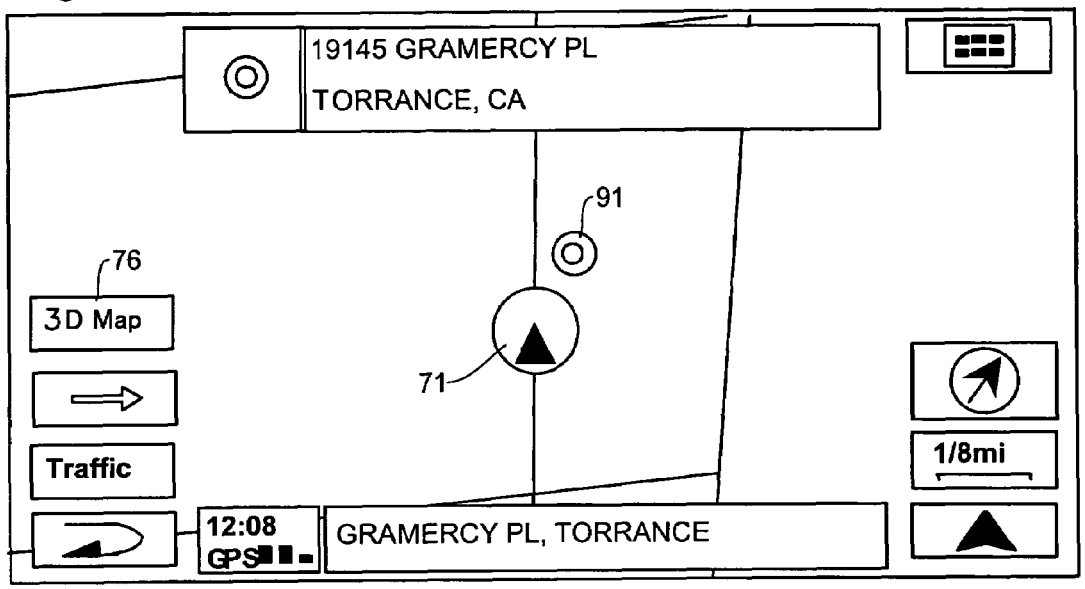
FIGS. 3A-3D are schematic diagram showing display examples of the navigation under the present invention where
Figure 3B:
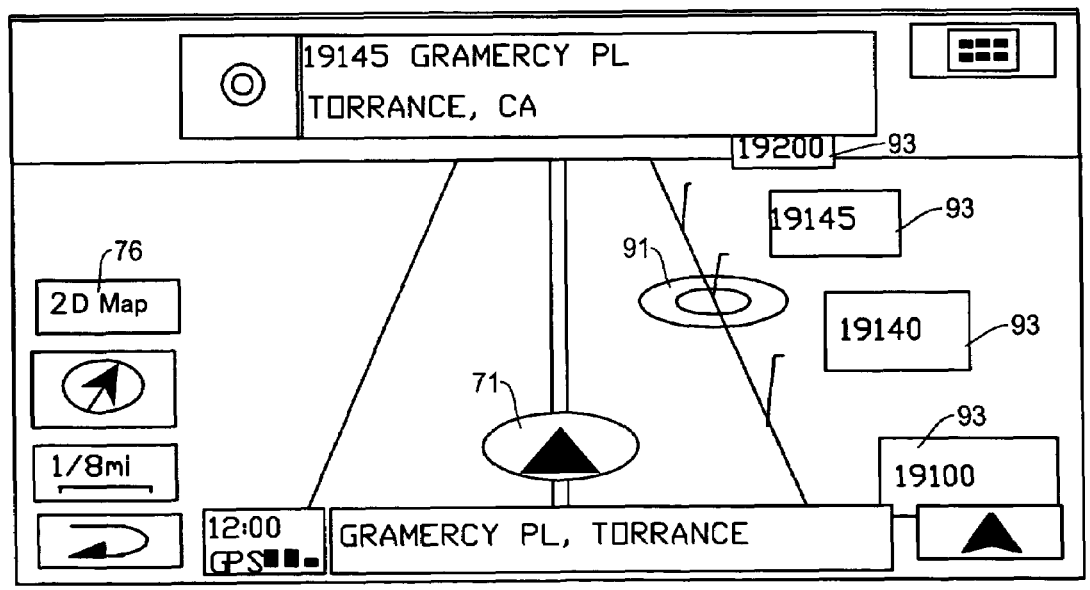
Figure 3C:
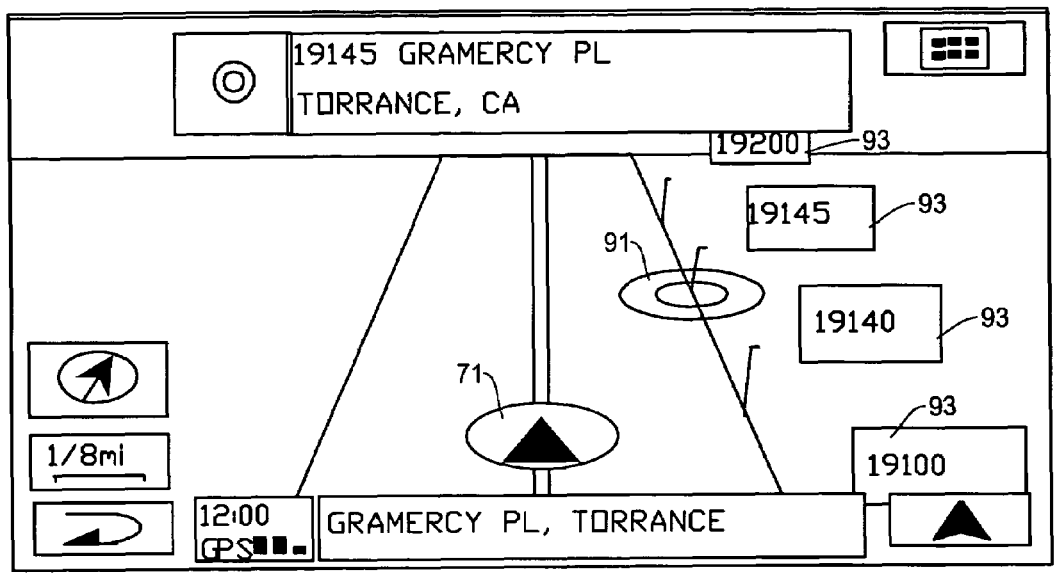
Figure 3D:
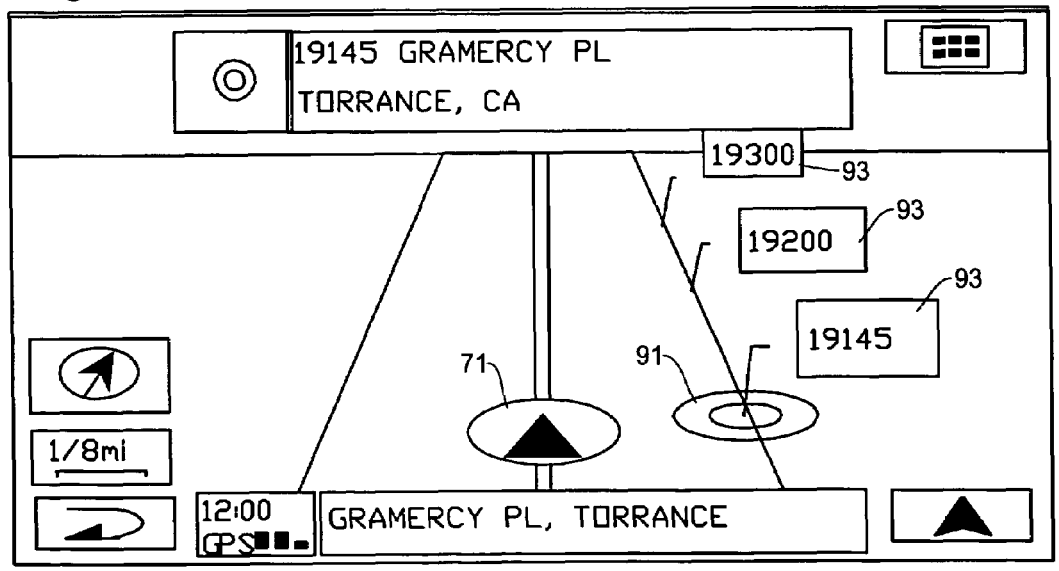

FIGS. 3A-3D show display examples of the navigation system under the present invention where FIGS. 3A and 3B show a relationship between two-dimensional and three-dimensional map images that can be automatically or manually switched with one another. FIG. 3C shows the situation where the vehicle is close to the destination, and FIG. 3D shows the situation where the vehicle has arrived at the destination. When the user selects a destination through the procedure such as shown in FIGS. 1A-1H, the navigation system shows a map image to indicate a calculated route and a relative location of the vehicle on the map image.

As the vehicle approaches the destination and reaches within a predetermined distance from the destination, the navigation system automatically changes the two-dimensional map screen of FIG. 3A to a three-dimensional arrival screen of FIG. 3B. An example of the predetermined distance is, for example, 100-200 yards that can be adjusted by the user. It is also possible to take a configuration so that the user can manually switch between the two-dimensional map screen of FIG. 3A and the three-dimensional arrival screen of FIG. 3B through a switch-over key 76 on the left side of the screens.

The three-dimensional arrival screen shown in FIGS. 3C and 3D give the user an image similar to a three-dimensional outside view that the user would actually see in the neighborhood of the destination. The three-dimensional views of FIGS. 3C and 3D include a current position indicator 71, the road on which the vehicle is running, a destination indicator 91, and address indicators 93. The three-dimensional image may be calculated and rendered on the display by using the map data in the navigation system. As the vehicle comes closer to the destination, the navigation system will change the display to reflect the current position of the user.

Thus, as the vehicle proceeds to the destination, the location of the destination and neighboring spots on the display will change accordingly. The neighboring address indicators 93 include position marks and their street address numbers on the road that the user is moving. The current position indicator 71 shows the current position of the vehicle that is moving on the road.

The position mark and street address number "19145" of the address indicator 93 showing the destination are also associated with the destination indicator 91 on the screen. The address indicators 93 also show the position marks and street address numbers adjacent to the destination. This facilitates the user to conceive the current vehicle position relative to the destination and neighboring addresses accurately.

FIG. 3D shows a destination arrival image which is a three-dimensional view similar to that shown in FIG. 3C except that the vehicle has reached the destination. Because the vehicle has further moved from the location shown in FIG. 3C, the address indicators 93 show additional position marks and street address numbers while some position marks and street address numbers in FIG. 3C are removed. The navigation system may give a voice announcement indicating that the destination is reached.

Figure 4:
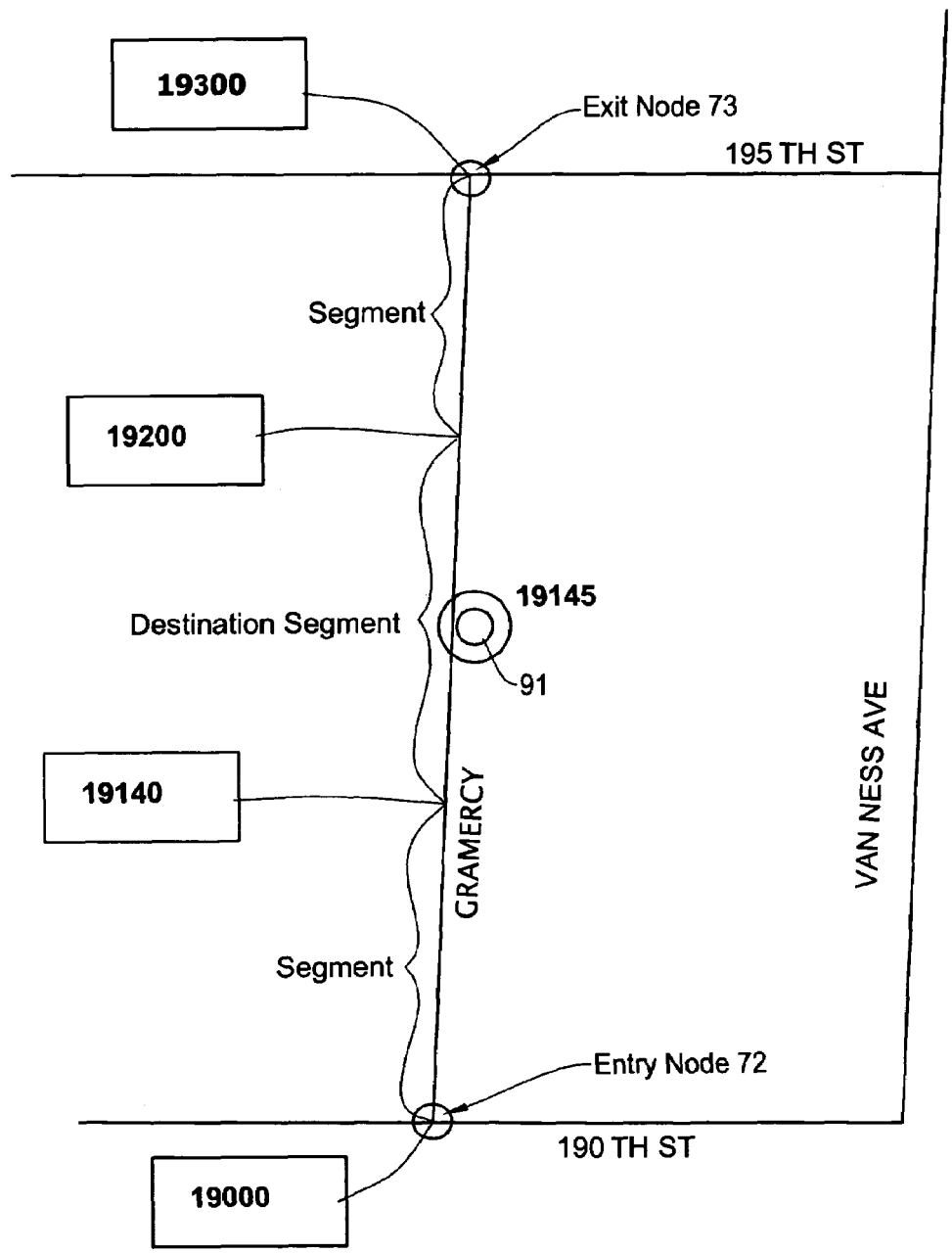
FIG. 4 is a schematic view showing the representation of roads, destination, road segments to describe the implementation of the three-dimensional arrival screen method under the present invention.

FIG. 4 is a schematic view showing the relationship among the destination, road segments and street address numbers to describe the implementation of the display method under the present invention. The map data storage in the navigation system stores the map information including a large number of road segments. A road segment is a segment that represents one unit of a road, thus, one road may be subdivided into a plurality of road segments. Each road segment has a start address number and an end address number and an absolute location of its each end is represented by latitude and longitude data (position data or node data).

Other than two ends of the road segment, the map data in the navigation system do not have information as to exact position of addresses located on the road segment. In other words, the map data include a street address number and an absolute location of each end of the road segment but do not have the street address numbers and absolute locations on the intermediate of the road segment. The position data (start and end of road segment) indicate points at which road segments intersect with one another.

As noted above, in a navigation system, a road is configured by connection of a plurality of road segments. Thus, in the example of FIG. 4, a road "GRAMERCY" is configured by three road segments where an entry node 72 is established at one end and an exit node 73 is established at another end. In this example, it is assumed that the street address number "19145" is the address of the destination which is indicated by the destination indicator 91.

As noted above, the navigation system does not necessarily have information on all positions corresponding to all addresses along the road. In the example of FIG. 4, only the locations for the addresses at each end of a road segment are known with a high degree of preciseness. That is, the locations of the addresses for the street address numbers 19300, 19200, 19140, and 19000 on the road "GRAMERCY" are known. The locations for addresses that are between the known street address numbers such as a street address number "19145" must be calculated to determine an approximate (estimated) location thereof.

Thus, for displaying the street address numbers and position marks in FIGS. 3C and 3D, the navigation system interpolates the position of a certain street address number by dividing the road segment between the two ends of the road segment. For example, in FIG. 4, the location of the street address number "19145" is determined by dividing the road segment that starts with the street address number "19140" and ends with the street address number "19200" in proportion to the numerical value of the street address number "19145". Thus, in the three-dimensional views of FIGS. 3C and 3D, the navigation system displays the location of the destination along with the locations of the neighboring street numbers.

Figure 5A:
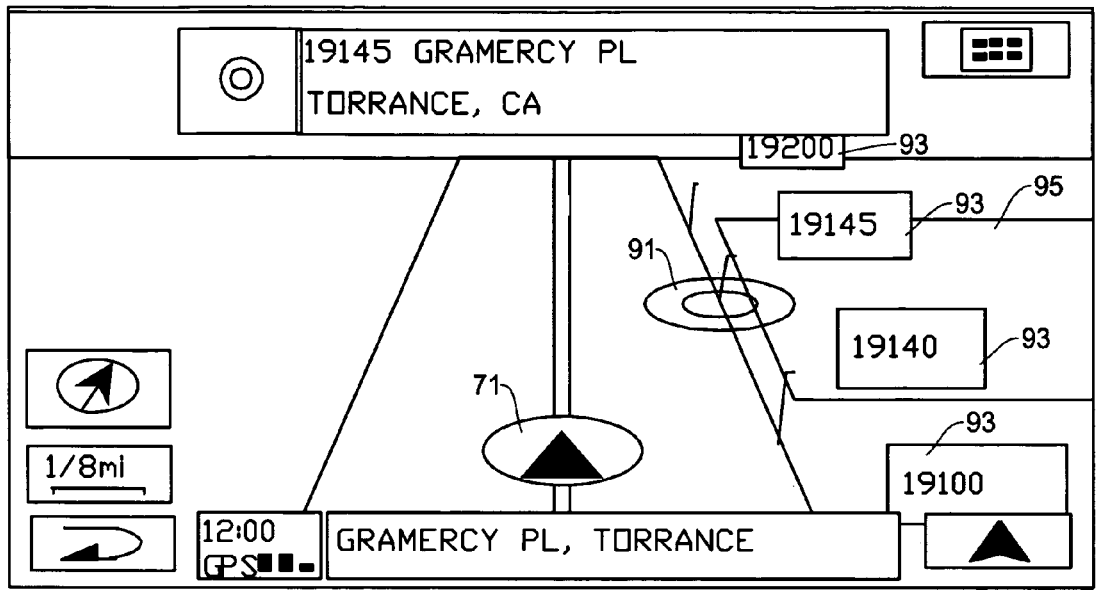
FIGS. 5A and 5B are schematic diagrams showing display examples under the present invention showing three-dimensional arrival screen which include footprint data along the road in the neighborhood of the destination.
Figure 5B:
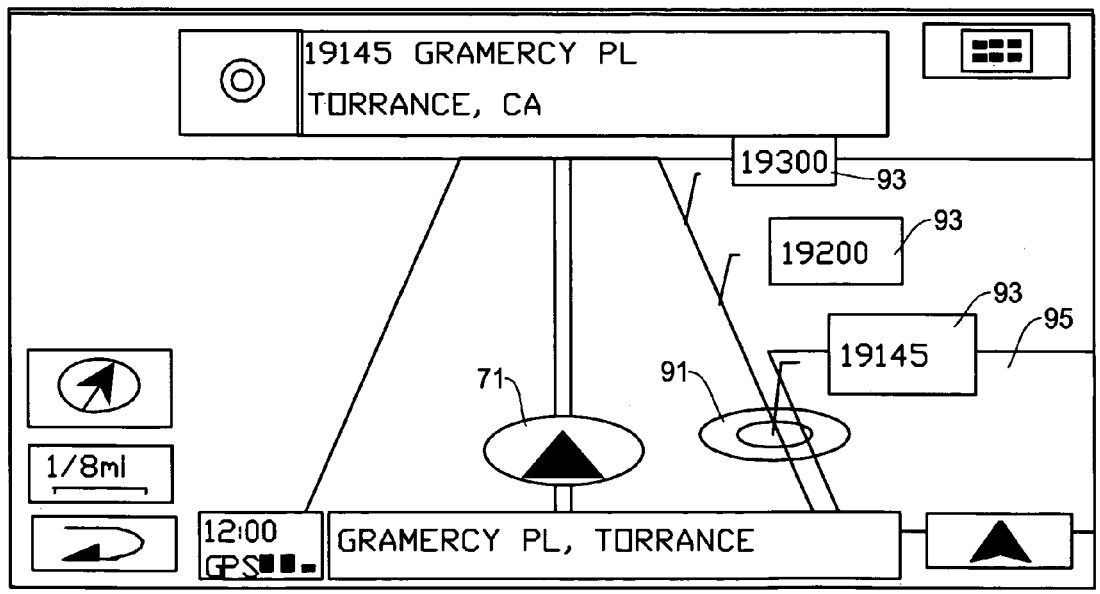

FIGS. 5A and 5B show three-dimensional arrival screens of the present invention where FIG. 5A shows the situation where the vehicle is close to the destination and FIG. 5B shows the situation where the vehicle has arrived at the destination. In the example of FIGS. 5A and 5B, the navigation system displays the three-dimensional arrival screen which includes the destination associated with building footprint data. Namely, the three-dimensional arrival screen also shows an image of building footprint in addition to the example of FIGS. 3C and 3D.

Generally, the recent map data include footprint data (also referred to as "polygon data") showing a topological shape of a relatively large structure. The footprint data define the topological shape of such a large structure by absolute positions of corner points of the structure by latitude and longitude values. Since the building footprint data include accurate position information, it is expected that the building footprint data help in estimating an accurate location of a destination by incorporating the position information.

Therefore, the three-dimensional views of FIGS. 5A and 5B show a current vehicle position indicator 71, the road on which the user's vehicle is running, a destination indicator 91, a topological shape 95 based on the building footprint data, and neighboring address indicators 93. In this example, the destination is represented by the building footprint, which will be described later in detail with reference to FIG. 6, in addition to the destination indicator and the street address number. As the vehicle comes closer to the destination, the navigation system will change the display to reflect the change of the vehicle position on the three-dimensional screens.

Since the footprint data include information on the absolute locations of the structure, if the destination is associated with such a structure, the navigation system can estimate the location of the destination more accurately. The location of the destination thus estimated is displayed on the three-dimensional screen in combination with the street address numbers of neighboring addresses, thus, the user can determine the actual location of the destination. Although the footprint area is a simple rectangular shape in this example, it can take any other shape to conform to the shape of the actual structure or natural object.

Figure 6A:
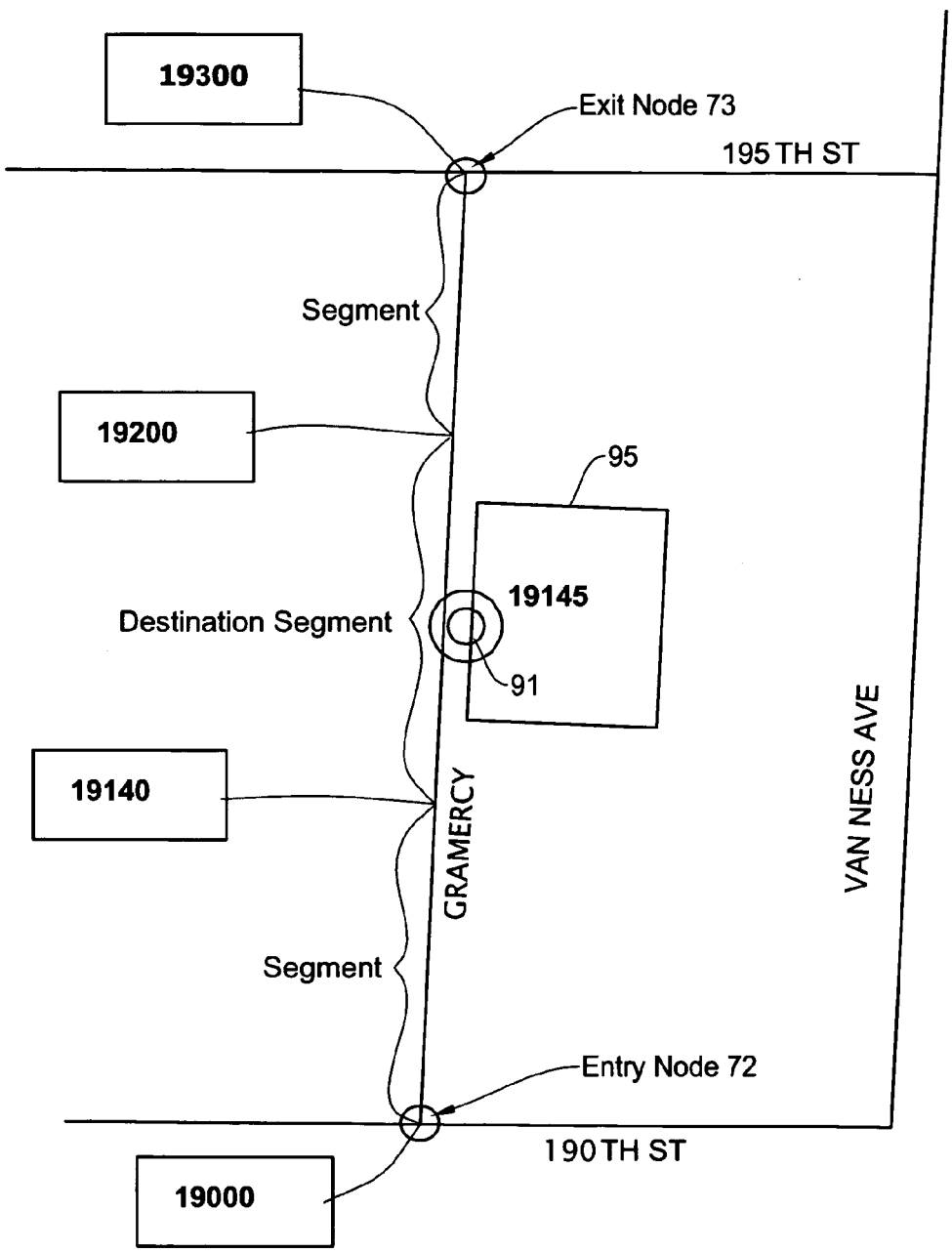
FIGS. 6A and 6B are schematic views showing the representation of roads, destination, road segments to describe the implementation of the present invention which includes footprint data along the road in the neighborhood of the destination.
Figure 6B:
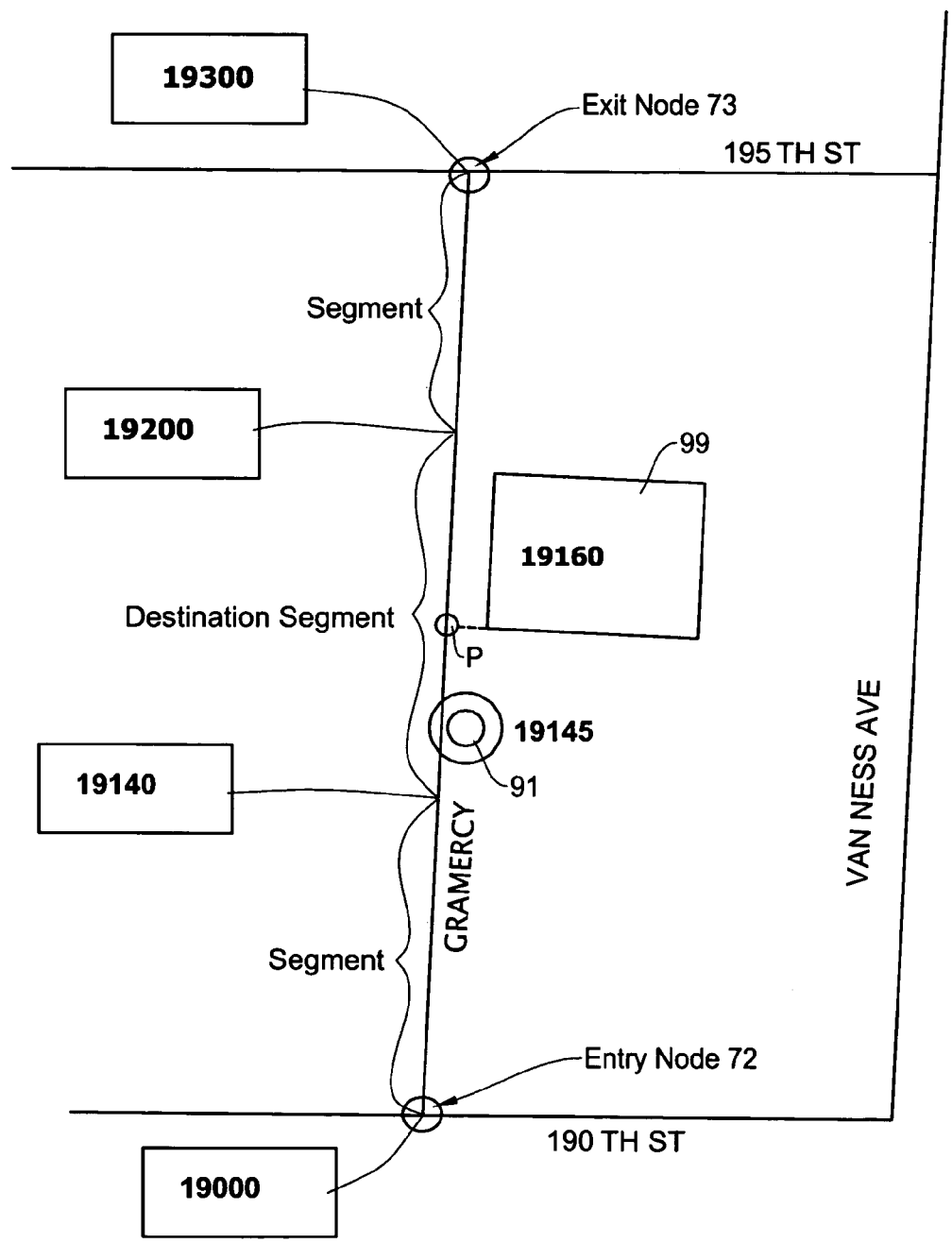

FIGS. 6A and 6B are schematic views showing the relationship among the destination, road segments, building footprint, and address street numbers to describe the implementation of the display method under the present invention in the situation corresponding to FIGS. 5A and 5B. In the example of FIG. 6A, a topological shape of the building 95 at the destination "19145 GRAMERCY" is illustrated based on the footprint data. In the footprint data, at least each corner point of the building footprint is given by an absolute position expressed by latitude and longitude values. Thus, such corner positions can be used to correlate with the positions of the end of the road segment on which the destination is located to accurately assign the locations on the road segment.

Thus, in the example shown in FIGS. 6A and 6B, not only the locations for the addresses at the ends of road segments, but also the topological shape of the building 95 is included to correlate with the locations on the road segments. That is, the locations of the addresses for the street address numbers 19300, 19200, 19140, 19000 as well as the location of the footprint having the address of 19145 are known. Since the destination is also expressed by the building footprint, the user can easily determine the actual arrival of the destination by comparing the three-dimensional screen of the navigation system and an actual view outside of the vehicle.

FIG. 6B shows another situation where there exist building footprint data adjacent to the address of the destination. In this example, the map data include footprint data of a building 99 on the road (destination) segment with the street address number "19160". Because the street address number of the building 99 is "19160", the navigation system determines that the position on the road segment corresponding to the lower end (marked by point P) of the building 99 has the address number "19160". Thus, the locations of the street address number "19145" of the destination and neighboring addresses are determined by interpolating between the absolute positions of the address numbers "19160" and "19140". As a result, the locations of the destination and the neighboring addresses can be displayed on the three-dimensional arrival screen of FIGS. 5A-5B with high accuracy.

Figure 7A:
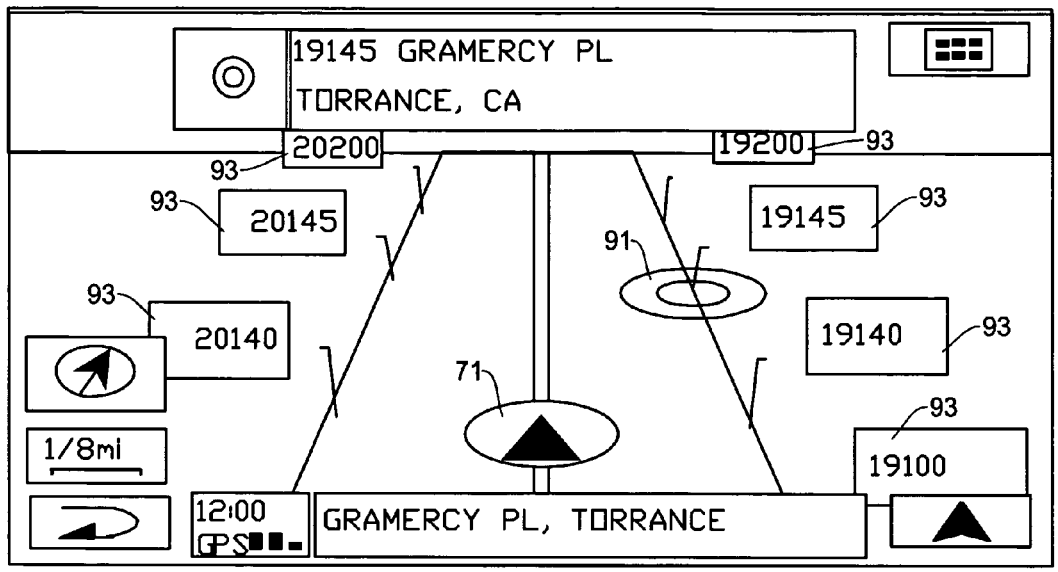
FIGS. 7A and 7B are schematic diagrams showing further examples of three-dimensional arrival screen under the present invention where
Figure 7B:
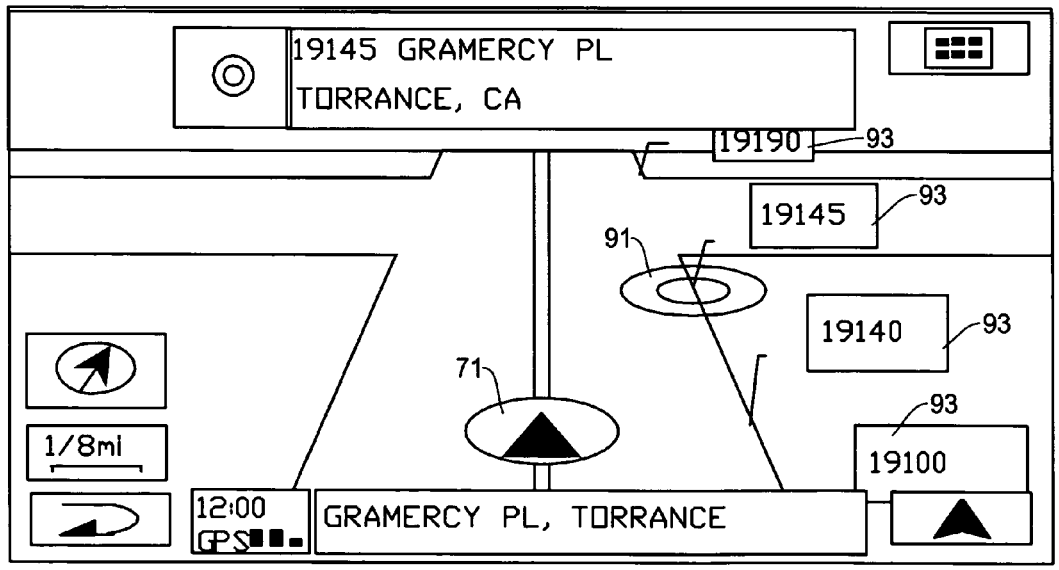

FIGS. 7A and 7B show other examples of three-dimensional arrival screen that include the destination and neighboring areas. In FIG. 7A, the three-dimensional arrival screen includes street address numbers on both sides of the road. Namely, address indicators 93 showing position marks and street address numbers are provided on the three-dimensional screen not only on the side where the destination is located but also on the other side as well. The user can easily identify the present location by comparing the actual view with the addresses on both sides of the road.

Although the three-dimensional arrival screen shown and described above illustrate a straight road along which the destination and neighboring addresses are located, the arrival screen may also show a curved road or an intersection depending on the location where the destination is located. FIG. 7B shows such an example where the three-dimensional arrival screen shows an intersection in the case where a destination is located close to the intersection. Since an image of the intersection is also included in the three-dimensional arrival screen, the user can easily correlate the map image on the arrival screen with the actual road situation.

Further, the images on the three-dimensional arrival screen in the navigation system may vary to reflect the actual street condition. In case where there is a well-known scenic area in the neighborhood of the destination, the navigation system may show such a symbol on the display. Moreover, icons of well-known franchise restaurants may be also shown on the three-dimensional arrival screen so that the user is able to identify the current location comparing with the well-known restaurant relative to the destination.

Figure 8:
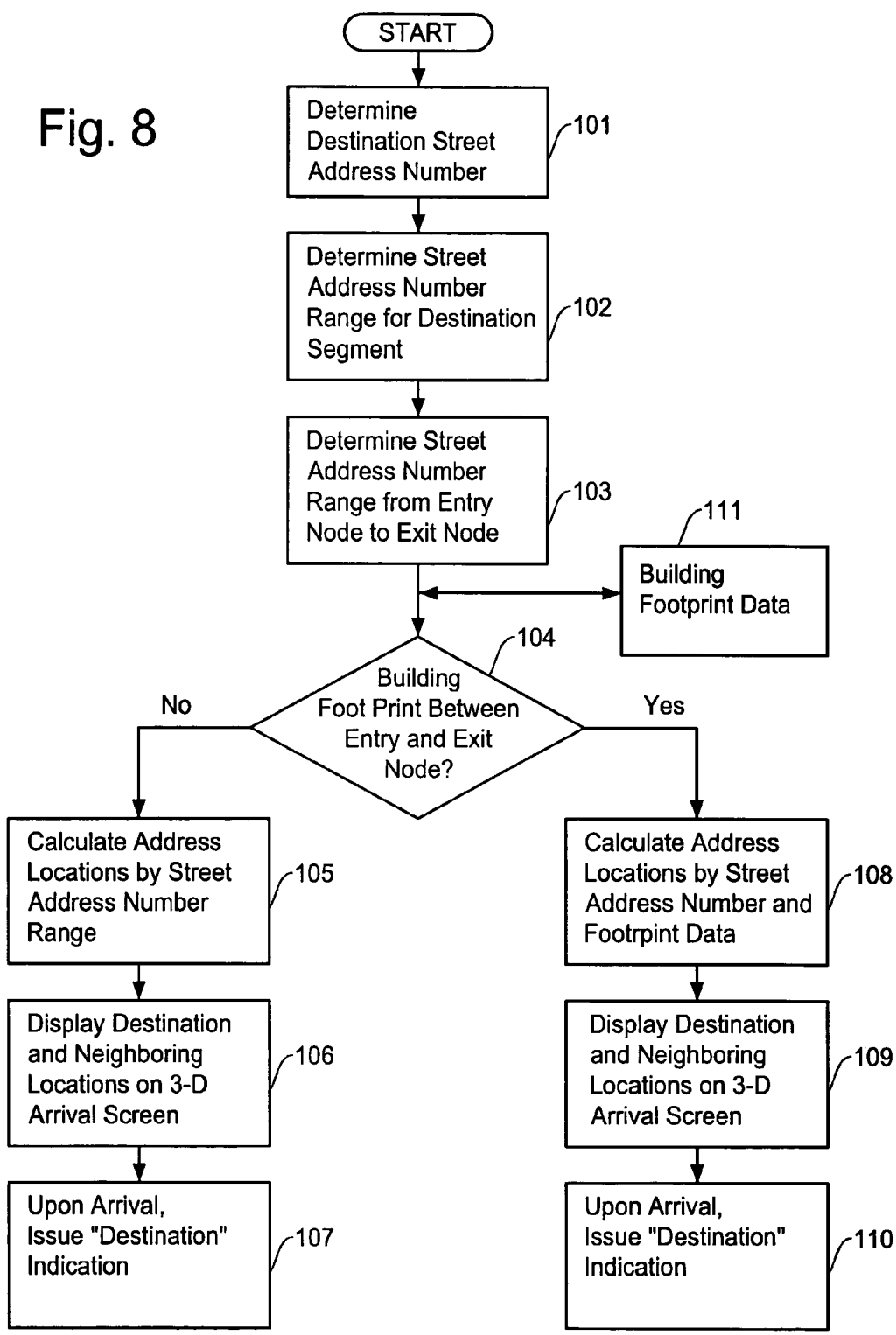
FIG. 8 is a flow chart showing the operational steps of the present invention for estimating the location of the destination and neighboring addresses along the road and displaying those locations and the street address numbers on a three-dimensional arrival screen.

An example of operational steps for conducting the present invention is described with reference to the flow chart of FIG. 8. As described above, the present invention estimates the location of the destination and neighboring addresses along the road and displays the street address numbers of those locations on a three dimensional screen. As the user selects a destination and the navigation system determines the route to the destination as described with reference to FIGS. 1A to 1H, the navigation system starts the operation of estimating the location of the destination and neighboring addresses.

In step 101, the navigation system determines the street address (house) number of the destination. In the case described with reference to FIGS. 3C-3D and 4, the street address number of the destination is "19145". The navigation system then determines a range of street address number of the road segment (destination segment) that should have the street address number "19145" in step 102. In the example of FIGS. 3C-3D and 4, the road segment having the street address number range between "19140" and "19200" on the road "GRAMERCY" is the destination segment.

In step 103, the navigation system determines the street address number range from the entry node and the exit node of the road "GRAMERCY". In the above example, the street address number ranges from "19000" at the entry node to "19300" at the exit node as shown in FIG. 4. Next, at step 104, the navigation system checks the map data file ("Building Footprint Data" in FIG. 8) 111 whether footprint data exists between the entry and exist node of the road "GRAMERCY".

As noted above with reference to FIGS. 5A-5B and 6, the recent map data include footprint data (polygon data) of relatively large structures or natural objects that express topological shapes thereof. Thus, when the destination is specified, the navigation system checks the map data file 111 as to whether there is any polygon (footprint) data associated with the street segment. Namely, the navigation system checks whether there is any structure accompanied by footprint data defined by latitude and longitude data.

If no footprint data exists between the entry node and exist node, at step 105, the navigation system calculates the locations of the destination and neighboring addresses by interpolating the street address numbers on the road segment between the two ends. In the example of FIGS. 3C-3D and 4, the street address number "19145" is located on the road (destination) segment between the address range from "19140" to "19200". Thus, the navigation system proportionally divides the locations on the road segment between the street address numbers "19140" to "19200" by the difference which, in this case, is "60". Then, the location corresponding to the difference "5" between the street address number "19140" and the street address number "19145" is allocated on the road segment.

Then, in step 106, the navigation system displays the three-dimensional arrival screen showing the destination and the neighboring addresses with street address numbers. As shown in FIG. 3C, the address indicators 93 show position marks and street address numbers of the destination and neighboring addresses on the three-dimensional arrival screen which also include the indicators showing the current vehicle position and destination. When the vehicle comes sufficiently close to the destination on the three-dimensional arrival screen as shown in FIG. 3D, the navigation system announces the arrival at the destination at step 107.

In the above noted step 104, if it is determined that the building footprint data exists between the exit node and the entry node, the process moves to a step 108 where the navigation system calculates more accurate positions of the street address numbers on the road segment. This procedure is done by combining the absolute locations of the points on the building footprint with the absolute locations of the ends of the road segment and interpolating between the two adjacent absolute locations. Thus, the navigation system is able to accurately determine the locations of the street address numbers of the destination and neighboring addresses.

After the calculation, the navigation system displays the destination and neighboring address spots on the three-dimensional arrival screen as shown in FIG. 5A when the vehicle comes close to the destination in step 109. As shown in FIG. 5A, the address indicators 93 show position marks and street address numbers of the destination and neighboring addresses on the three-dimensional arrival screen and the building footprint image. The three-dimensional arrival screen also includes the indicators showing the current vehicle position and destination. When the vehicle comes sufficiently close to the destination on the three-dimensional arrival screen as shown in FIG. 5B, the navigation system announces the arrival at the destination in step 110.

Figure 9:
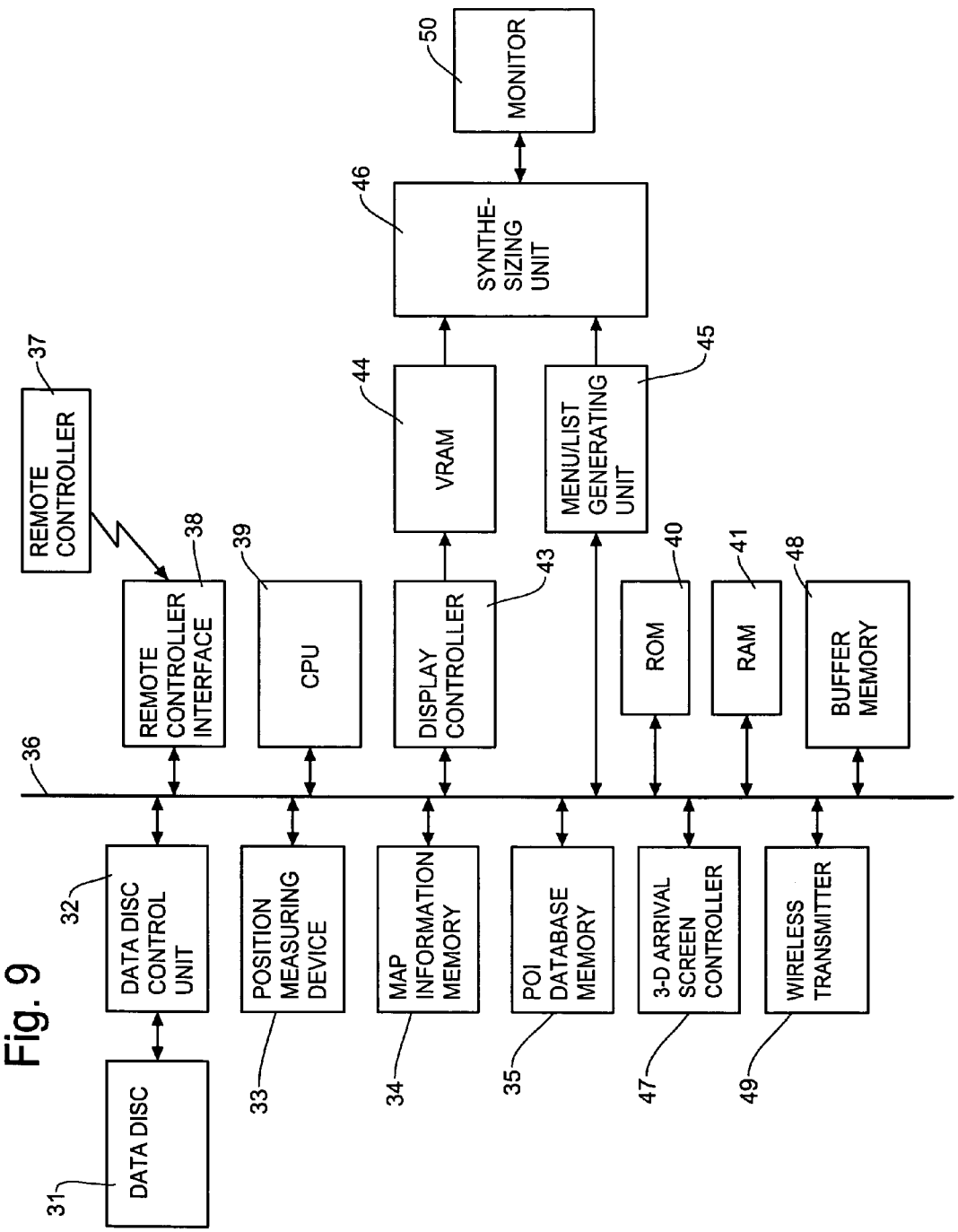
FIG. 9 is a block diagram showing an example of configuration of a vehicle navigation system implementing the three-dimensional arrival screen of the present invention.

FIG. 9 shows an example of structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver, and etc.

The block diagram of FIG. 9 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 9, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image or an arrow guide image) on the basis of the map information, a VRAM 44 for storing images generated by the display controller 43, a menu/list generating unit 45 for generating menu image/ various list images, a synthesizing unit 46, a three-dimensional arrival screen controller 47, a wireless transmitter 49 for wireless communication to retrieve data from a remote server, a buffer memory 48 for temporally storing data for ease of data processing, and a monitor (display) 50.

The three-dimensional arrival screen controller 47 controls the operation to display the three-directional arrival screen such as shown in FIGS. 3C-3D, 5A-5B, and 7A-7B. The three-dimensional arrival screen controller 47 can be a CPU 39 noted above or a separate processor. The three-dimensional arrival screen controller 47 performs a function of the present invention for establishing the relationship among the street address numbers on the road segment and the actual positions of the destination and neighboring addresses and displaying the relationship on the three-dimensional arrival screen.

The three-dimensional arrival screen controller 47 reads out map data from the map information memory 34 to compute the position of the destination. By learning the actual locations of the destination and the neighboring addresses, the navigation system records the updated address data in the buffer memory 49. Thus, the navigation method and system is able to more accurately determine the positions of the destination and neighboring addresses so that it can accurately display the positional relationship on the three-dimensional arrival screen.

As has been described above, according to the present invention, the navigation system allows the user to more easily and accurately identify the actual location of the destination by displaying the three-dimensional arrival screen which shows the relationship among the location of the destination, the locations of the neighboring addresses, and the current vehicle position. Since the three-dimensional arrival screen shows position marks and street address numbers of the destination and neighboring addresses, the user is able to accurately specify the destination by comparing the image on the three-dimensional screen with the outside view.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying an arrival screen for a navigation system, comprising the following steps of:

receiving a street address number of a destination specified by a user;

retrieving data indicating a road segment which includes the specified street address number thereon from a map information storage;

estimating positions of the destination and neighboring addresses based on street numbers of the destination, neighboring addresses, and position data of the road segment by interpolating between at least two absolute positions on the road segment and assigning an interpolated location to the destination;

detecting whether the user comes within a predetermined distance range from the destination; and displaying a three-dimensional arrival screen when the user comes within the predetermined distance range from the destination;

wherein the three-dimensional arrival screen includes the estimated position of the destination, a current position of the user, a road on which the user is moving, all of which are displayed in a three-dimensional manner on the screen, and street address numbers of the destination and the neighboring addresses.

2. A method for displaying an arrival screen as defined in claim 1, wherein said step of estimating the positions of the destination and neighboring addresses includes a step of interpolating between two street address numbers on the road segment when the absolute positions of the two street address numbers are known.

3. A method for displaying an arrival screen as defined in claim 1, wherein said three-dimensional arrival screen further includes position marks showing the positions of the destination and the neighboring addresses.

4. A method for displaying an arrival screen as defined in claim 1, further comprising the steps of:
checking whether any footprint data exist adjacent to the road segment which includes the specified street address of the destination; and
estimating positions of the destination and neighboring addresses by incorporating position information included in the footprint data;
wherein the footprint data of a building includes the position information which is expressed by latitude and longitude data indicating a shape, size and location of the building.

5. A method for displaying an arrival screen as defined in claim 4, wherein said step of estimating the positions by incorporating the position information included in the footprint data includes a step of interpolating between a street address number on the road segment and a selected point on the road segment corresponding to the latitude and longitude data of the building retrieved from the footprint data.

6. A method for displaying an arrival screen as defined in claim 4, wherein said three-dimensional arrival screen further includes an image showing a topological shape of the building derived from the footprint data.

7. A method for displaying an arrival screen as defined in claim 3, wherein said position marks and street address numbers are provided on one side of the road on which the user is moving toward the destination where the destination is located on said one side.

8. A method for displaying an arrival screen as defined in claim 3, wherein said position marks and street address numbers are provided on both sides of the road on which the user is moving toward the destination without regard to which side of the road the destination is located.

9. A method for displaying an arrival screen as defined in claim 1, further comprising the step of switching between a two dimensional screen and the three-dimensional screen at any desired time by operating a switch-over key.

10. A method for displaying an arrival screen as defined in claim 3, wherein said three-dimensional arrival screen further includes an image of an intersection when the intersection is located close to the destination.

11. An apparatus for displaying an arrival screen for a navigation system, comprising:
means for receiving a street address number of a destination specified by a user;
means for retrieving data indicating a road segment which includes the specified street address number thereon from a map information storage;
means for estimating positions of the destination and neighboring addresses based on street numbers of the destination, neighboring addresses, and position data of the road segment by interpolating between at least two absolute positions on the road segment and assigning an interpolated location to the destination; and
means for detecting whether the user comes within a predetermined distance range from the destination;
means for displaying a three-dimensional arrival screen when the user comes within the predetermined distance range from the destination;
wherein the three-dimensional arrival screen includes a position of the destination, a current position of the user, a road on which the user is moving, all of which are displayed in a three-dimensional manner on the screen, and street address numbers of the destination and the neighboring addresses.

12. An apparatus for displaying an arrival screen as defined in claim 11, wherein said means for estimating the positions of the destination and neighboring addresses includes means for interpolating between two street address numbers on the road segment when absolute positions of the two street address numbers are known.

13. An apparatus for displaying an arrival screen as defined in claim 11, wherein said three-dimensional arrival screen further includes position marks showing the positions of the destination and the neighboring addresses.

14. An apparatus for displaying an arrival screen as defined in claim 11, further comprising:
means for checking whether any footprint data exist adjacent to the road segment which includes the specified street address of the destination; and
means for estimating positions of the destination and neighboring addresses by incorporating position information included in the footprint data;
wherein the footprint data of a building includes the position information which is expressed by latitude and longitude data indicating a shape, size and location of the building.

15. An apparatus for displaying an arrival screen as defined in claim 14, wherein said means for estimating the positions by incorporating the position information included in the footprint data includes means for interpolating between a street address number on the road segment and a selected point on the road segment corresponding to the latitude and longitude data of the building retrieved from the footprint data.

16. An apparatus for displaying an arrival screen as defined in claim 14, wherein said three-dimensional arrival screen further includes an image showing a topological shape of the building derived from the footprint data.

17. An apparatus for displaying an arrival screen as defined in claim 13, wherein said position marks and street address numbers are provided on one side of the road on which the user is moving toward the destination where the destination is located on said one side.

18. An apparatus for displaying an arrival screen as defined in claim 13, wherein said position marks and street address numbers are provided on both sides of the road on which the user is moving toward the destination without regard to which side of the road the destination is located.

19. An apparatus for displaying an arrival screen as defined in claim 11, further comprising means for switching between a two dimensional screen and the three-dimensional screen at any desired time by operating a switch-over key.

20. An apparatus for displaying an arrival screen as defined in claim 13, wherein said three-dimensional arrival screen further includes an image of an intersection when the intersection is located close to the destination.

* * * * *